United States Patent
Cutting

(10) Patent No.: US 6,238,311 B1
(45) Date of Patent: May 29, 2001

(54) BLADE TENSIONER WITH RETAINING PIN AND BRACKET

(75) Inventor: William D. Cutting, Lansing, NY (US)

(73) Assignee: BorgWarner Inc., Troy, MI (US)

(*) Notice: Subject to any disclaimer, the term of this patent is extended or adjusted under 35 U.S.C. 154(b) by 0 days.

(21) Appl. No.: 09/427,853

(22) Filed: Oct. 27, 1999

(51) Int. Cl.⁷ ........................................................ F16H 7/00
(52) U.S. Cl. ............................ 474/111; 474/109; 474/140
(58) Field of Search .................................. 474/101, 109, 474/111, 135, 140

(56) References Cited

U.S. PATENT DOCUMENTS

| | | |
|---|---|---|
| 3,490,302 | 1/1970 | Turner . |
| 4,798,562 * | 1/1989 | Matson et al. ........................ 474/101 |
| 4,921,472 | 5/1990 | Young . |
| 5,055,088 | 10/1991 | Cradduck et al. . |
| 5,266,066 | 11/1993 | White . |
| 5,286,234 | 2/1994 | Young . |
| 5,425,680 * | 6/1995 | Young ................................... 474/111 |
| 5,462,493 | 10/1995 | Simpson . |
| 5,711,732 * | 1/1998 | Ferenc et al. ........................ 474/111 |
| 5,957,793 | 9/1999 | Schulze . |
| 5,984,815 * | 11/1999 | Baddaria .............................. 474/111 |
| 6,155,941 * | 12/2000 | White et al. ......................... 474/110 |

* cited by examiner

Primary Examiner—David A. Bucci
Assistant Examiner—Vicky A. Johnson
(74) Attorney, Agent, or Firm—Sidley & Austin; Greg Dziegielewski

(57) ABSTRACT

A chain tensioner assembly including a blade spring in interlocked association with a plastic shoe. The shoe includes slots at one end and a protruding portion and cylindrical hollow sleeve located at the other end to securely hold the blade spring thereagainst. The assembled shoe and blade spring is pivotally mounted to a bracket. The bracket has a tab with a notch in alignment with the hollow sleeve. A removable retaining pin engages the notch in the bracket and passes through the hollow sleeve to secure the tensioner to the bracket in a retracted state for shipping and subsequent application to an engine.

5 Claims, 2 Drawing Sheets

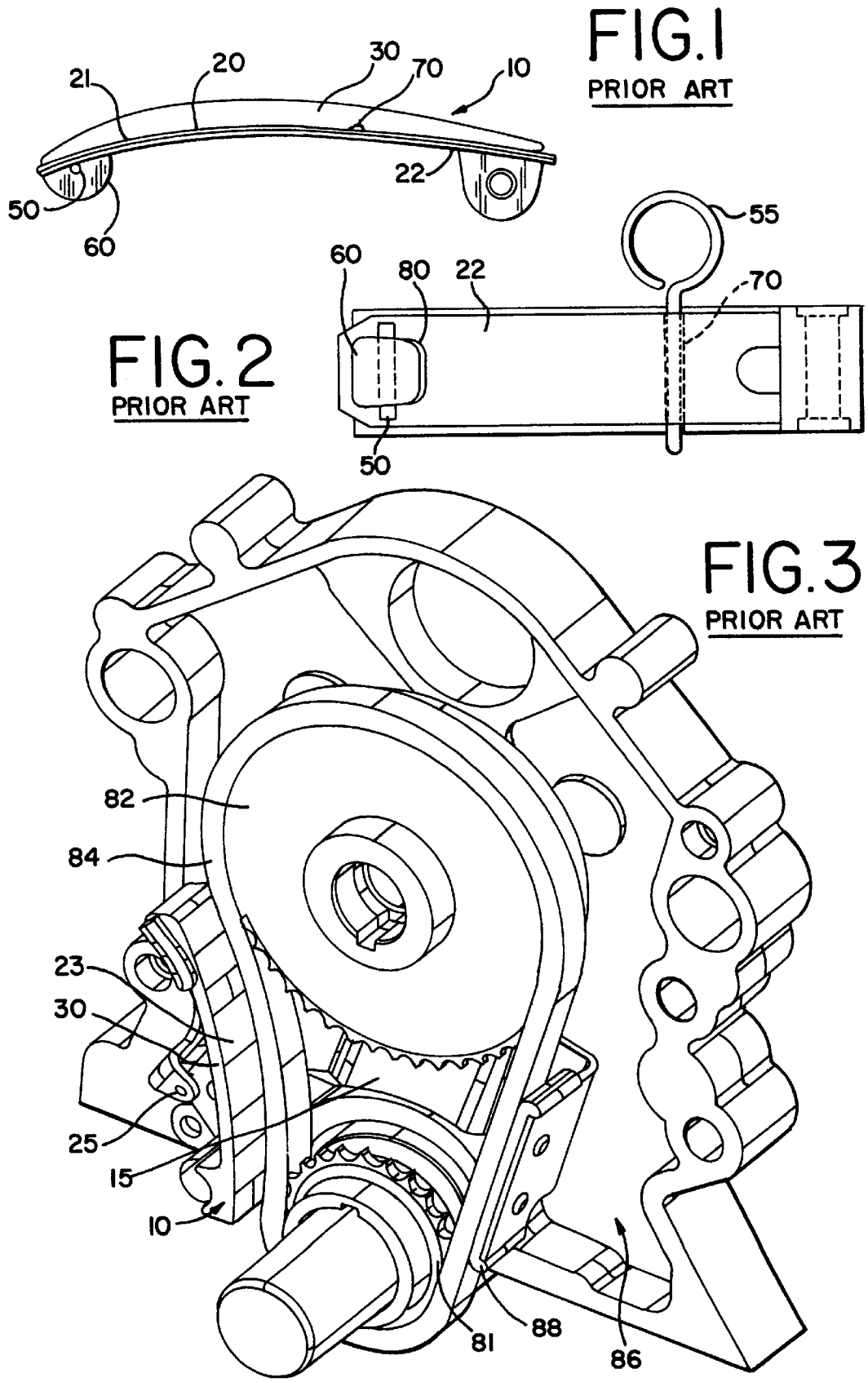

BLADE TENSIONER WITH RETAINING PIN AND BRACKET

BACKGROUND OF THE INVENTION

This invention relates to a tensioners used with chain drives in automotive timing applications and more particularly to a blade-type tensioner which is provided mounted to a bracket and held in place by a retaining pin for shipping and convenient assembly to an engine.

Tensioning devices are used as a control device for a power transmission chain as the chain travels between a plurality of sprockets. Generally, it is important to impart and maintain a certain degree of tension to the chain to prevent noises or slippage. Prevention of slippage is especially important in the case of a chain driven camshaft in an internal combustion engine because slippage may alter the camshaft timing by several degrees, possibly causing damage. In the harsh environment in which an internal combustion engine operates, chain tension can vary between excessively high or low levels as a result of the wide variations in temperature and differences between the coefficients of linear expansion among the various parts of the engine, including the chain and the tensioner. Camshaft and crankshaft induced torsional vibration cause chain tension to vary considerably. This tension variation results in chain elongation. Moreover, wear of the chain components during prolonged use can cause elongation of the chain that results in a decrease in the tension of the chain.

Generally, blade-type tensioners use a spring blade interlocked under tension with a plastic shoe to provide tension to a chain. Before assembly into a operable tensioner the blade spring is preformed into an arcuate shape and the shoe is provided relatively flat. The shoe is constructed from a semi-rigid material which will deform or "creep" upon experiencing a load at high temperature. During assembly, the blade spring is flattened to correspond to the shape of the shoe and then interlocked with it. Because the semi-rigid shoe prevents the blade spring from returning to its original more arcuate shape, the blade spring applies a load to the shoe. After application of the tensioner to an engine, the heat from the engine, during operation, causes the temperature of the shoe to increase and become less rigid. The load from the blade spring causes the shoe to deform to a more arcuate shape. Through such deformation, tension is provided to a chain.

The chain tensioner is positioned to act against a free length of the chain between the sprocket gears. As the blade spring forces the shoe into a more arcuate shape, the apex of the shoe extends farther into the span of chain thereby increasing chain tension.

Typical blade-type chain tensioners have interlocked a blade spring to a shoe. For example, U.S. Pat. No. 3,490,302, to Turner et al., incorporated herein by reference, discloses a chain tensioner where the blade spring is mounted to mechanically interlock with, and thereby provide a load to, a shoe through a hole and pin combination. The blade spring continuously bears against the shoe.

Yet another structure for mounting a blade spring to a single shoe is disclosed in U.S. Pat. No. 5,055,088, to Cradduck et al., incorporated herein by reference. This reference discloses a blade-type tensioner which utilizes a plurality of blade springs interlocked with a plastic shoe through a passageway in the shoe and fastened using a split, or solid pin.

Unfortunately, the prior art blade-type tensioners have a drawback. Typically, blade-type tensioners are used in confined spaces and are supplied to engine assembly plants in a straight form for ease of assembly in the engine. In the prior art, the tensioner is fixed to a bracket in the flattened form by a retaining pin which passes between the blade spring and the shoe and engages a notch or slot formed in the shoe itself and further passes through a hole in the bracket fixing the blade tensioner in place. The formation of the notch in the shoe requires an additional manufacturing step and forms a potential weak spot in the shoe.

The prior art blade spring tensioner 10 is shown in FIGS. 1–3. The shoe 30 has a blade spring interconnected thereto, the blade spring including a pair of blade spring members 20, 22 disposed along a bottom face 21 of the shoe 30. One end of the blade spring is held by being inserted into a slot in the shoe. The other end of the blade spring has an opening 80 which is fitted over a projection 60 on the corresponding end of the shoe and is locked in place by a solid or split pin 50 passing crosswise through the projection 60.

A slot 70 is formed near the center of the bottom face 21 of the shoe 30 adapted to receive a retaining pin 55 (shown in FIG. 2). When the tensioner 10 is first mounted to the bracket 15, the retaining pin 55 is passed through the tab 25 formed on the bracket 15 aligned with the slot 70 in the center portion of the shoe 30 and through a hole formed in the bracket, thus locking the shoe in place.

FIG. 3 illustrates the prior art blade tensioner 10 as applied to a generalized power transmission system including a driving sprocket 81, a driven sprocket 82 and a chain 84 connecting the two sprockets. The blade tensioner 10 is mounted to the bracket 15 which, when mounted to the engine block 86, directs the upper face 23 of the tensioner shoe 30 to tension the slack portion of the chain 84. The bracket 15 includes a tab 25 spaced outward from the bracket face and located adjacent to the mid portion of the tensioner shoe 30. The bracket 15 further includes a passive snubber 88 generally opposite the tensioner 10 and applied to the drive side of the chain.

The present invention is directed to a blade tensioner that addresses the problem of retaining the tensioner to the bracket by supplying a ready-to-use assembly that is easy and inexpensive to manufacture, simple to apply to an engine and results in a stronger tensioner.

SUMMARY OF THE INVENTION

The present invention is directed to a chain tensioner comprising a blade spring in interlocked association with a plastic shoe. The shoe includes a mechanism to securely retain the blade spring thereagainst and a further releasable mechanism to retain the tensioner in a retracted position when mounted upon on a bracket until the unit is installed in an engine timing system and released to permit operation.

In one embodiment, the bottom face at one end of the tensioner shoe has a knurl with a transverse bore for pivotal attachment to a pivot pin. A pair of longitudinal spring slots are formed in the knurl. The other end of the shoe has a protrusion on the bottom face. A bore is formed through the protrusion transverse to the longitudinal axis of the shoe. The bores of the knurl and the protrusion are parallel to each other. One end of the blade spring is inserted into the spring slots and the other end of the blade spring has an opening which fits over the protrusion. The blade spring is interlocked onto the shoe by a hollow roll pin located in the bore of the protrusion.

The interlocked shoe and blade spring are assembled to a bracket. The bracket includes a pivot pin extending from the face of the bracket for pivotal mounting of the first end of the shoe. The bracket also has a notched tab spaced outward from the bracket face and located adjacent the protrusion at the second or free end of the shoe. A retaining pin engages the notch in the tab and passes through the hollow roll pin thereby retaining the shoe to the bracket in a retracted state prior to application of the assembly to an engine. An integral passive snubber is attached to the bracket generally opposite the tensioner.

The advantages and features of the chain tensioner apparatus of the present invention will be better understood by reference to the embodiments which are hereafter presented and depicted by way of example in the following description taken in conjunction with the accompanying drawings in which like reference numbers are used to indicate like elements.

BRIEF DESCRIPTION OF THE DRAWINGS

FIG. 1 is a front view of the blade tensioner of the prior art showing the notch formed in the shoe.

FIG. 2 is a bottom view of the tensioner shown in FIG. 1 with the notch represented by a dashed line.

FIG. 3 is a perspective view depicting the prior art chain tensioner apparatus in a "cam-in-block" drive train for an engine.

DETAILED DESCRIPTION OF THE PREFERRED EMBODIMENTS

Figure 4:
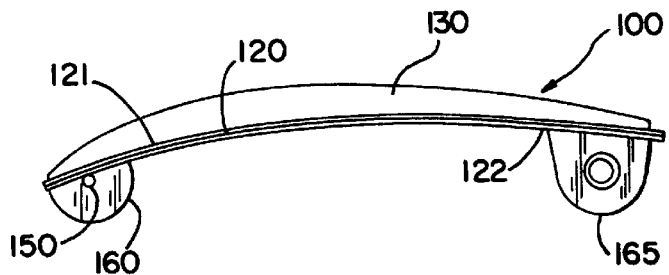
FIG. 4 is a front view of the interlocked blade spring and shoe of the present invention.
Figure 5:
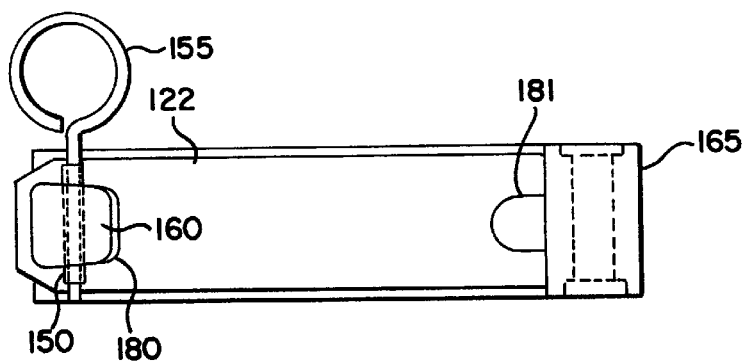
FIG. 5 is a bottom view of the blade tensioner shown in FIG. 4.
Figure 6:
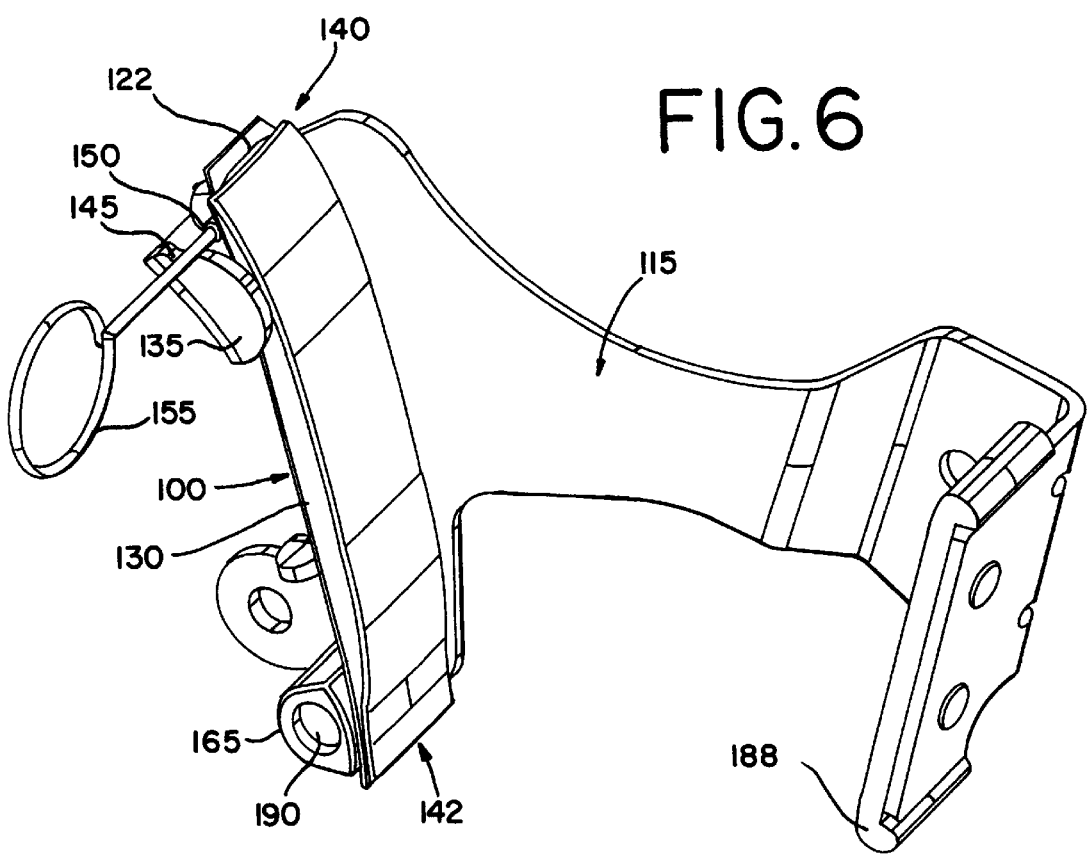
FIG. 6 is a perspective view of the preferred embodiment of the chain tensioner apparatus of the present invention mounted to a bracket and held in place by a retaining pin.

Turning now to the drawings, FIGS. 4, 5 and 6 disclose a preferred embodiment of the chain tensioner apparatus of the present invention. The chain tensioner of the present invention may be used in various engine types and configurations (including that illustrated in FIG. 3) in conjunction with various types of chain including but not limited to timing chains, power transmission chains, and the like.

The shoe 130 is preferably made of a plastic material that will creep under a continuous load applied thereto by the blade spring. The plastic material is preferably heat stabilized nylon 6/6. The shoe 130 also includes a mechanism to securely retain the blade spring means thereagainst, and in the preferred embodiment includes a hollow roll pin 150.

The blade spring may be a single or a plurality of generally flat, rectangular steel blade spring members. Each end of the blade spring may have a rounded knuckle formed to bear upon the bottom face of the shoe to reduce gouging of the shoe. In the case of a blade spring being a plurality of spring members, each spring member may be made of different materials, may have differing thicknesses, and may be subjected to any of a variety of different pretreatment processes, as known in the art, to match the characteristics of the blade spring to the desired load sought to be applied against the chain.

The blade spring is inserted within the shoe 130 as follows. While FIG. 4 depicts multiple spring members 120,122 and FIGS. 5 and 6 depict a single blade spring 122, it should be understood that reference to a blade spring 122 contemplates either single or multiple spring members. The blade spring 122 or pair of blade spring members 120,122 are deformed to correspond to the shape of the bottom face 121 of the shoe. The plastic shoe 130 is preferably molded straight or with very little curvature to allow for ease of assembly in the engine. Therefore, the blade spring must be deflected from its natural curve to a straight position for mechanical assembly within the shoe. A first end of the blade spring, which in one embodiment has a longitudinal slot 181 formed therein causing the spring to have two slat-like end portions, is inserted into slots formed in the knurl 165 at the first end 142 of the shoe 130. The second end of the blade spring 122 which has an opening 180 formed therein is fitted over a protrusion 160. The protrusion 160 extends from the bottom face 121 of the second end 140 of the shoe. A sleeve or hollow roll pin 150, which is hollow and preferably made of metal, is inserted through a bore in the protrusion 160. The bore is formed transverse to the longitudinal axis of the blade spring 122 and the shoe 130. The cylindrical sleeve 150 holds the blade spring 122 against the bottom face 121 of the shoe 130. The blade spring 122 is therefore mechanically interlocked with the plastic shoe 130. As used herein, the term interlocked does not comprehend bonding by adhesives, molding, or connection by riveting, bolting or screwing.

The pivot pin 190 is attached to one corner of the generally Y-shaped bracket 115. The interlocked blade spring 120,122 and shoe 130 is pivotally mounted to the pivot pin 190 by a transverse bore formed through the knurl 165. Part of the bracket 115, adjacent the free or second end 140 of the shoe 130 is formed into a tab 135. The tab 135 is spaced outward from the bracket face and has a notch 145 aligned with the hollow roll pin 150. The retaining pin 155 when placed in the hollow roll pin 150 engages the notch 145 in the tab 135 and thus holds the blade tensioner 100 in a retracted position. Removal of the retaining pin 155, after the assembly is attached to an engine, frees the second end 140 of the tensioner, allowing the tensioner to contact and act against the chain.

A passive snubber 188 for contact with the chain is attached to the bracket 115 located generally opposite the blade tensioner 100.

Those skilled in the art to which the invention pertains may make modifications and other embodiments employing the principles of this invention without departing from its spirit or essential characteristics, particularly upon considering the foregoing teachings. The described embodiments are to be considered in all respects only as illustrative and not restrictive and the scope of the invention, is therefore, indicated by the appended claims rather than by the foregoing description. Consequently, while the invention has been described with reference to particular embodiments, modifications of structure, sequence, materials and the like would be apparent to those skilled in the art, yet still fall within the scope of the invention.

What is claimed is:

1. A blade tensioner assembly for use with a chain comprising:

a bracket having a sidewall and a tab portion spaced outwardly from and substantially parallel to said sidewall, said tab portion having a notch formed therein, a pivot pin attached to said bracket and projecting laterally from said sidewall, a blade spring having first and second ends, a shoe having first and second ends adapted to receive said first and said second ends of said blade spring, said shoe being made of a plastic material which will creep when subjected to continuous stress applied thereto by said blade portion during operation of said chain along said blade portion, said first end of said shoe having a first bore formed therein, said second end of said shoe having a second bore formed therein, said shoe being pivotally disposed on said pivot pin by said second bore in said second end of said shoe, a cylindrical sleeve having a hollow center being disposed in said first bore of said shoe, said cylindrical sleeve and said notch in said bracket being substantially aligned, a retaining pin having an end inserted through said hollow center of said cylindrical sleeve, said retaining pin having a portion engaging said notch in said tab to thereby retain said shoe in a fixed position.

2. The blade tensioner assembly of claim 1 wherein said blade spring has a slot extending inwardly from said first end and a slot extending inwardly from said second end.

3. The blade tensioner assembly of claim 1 wherein a snubber is attached to said bracket generally opposite said shoe, said snubber being positioned to act on a free length of said chain.

4. The blade tensioner assembly of claim 1 wherein said first end of said blade spring has an opening formed therein and said second end of said blade spring has a longitudinal slot extending inwardly therefrom.

5. The blade tensioner assembly of claim 4 wherein said first end of said shoe has a projecting portion, said projecting portion of said shoe extending outwardly from a bottom face of said shoe, said protrusion being inserted through said opening of said blade spring when said blade spring is disposed along said bottom face of said shoe, said blade spring being held along said shoe by said cylindrical sleeve being disposed in said first bore.

* * * * *